(12) United States Patent
Srivastava et al.

(10) Patent No.: US 11,375,574 B2
(45) Date of Patent: Jun. 28, 2022

(54) LATENCY REDUCTION

(71) Applicant: QUALCOMM Incorporated, San Diego, CA (US)

(72) Inventors: Dishant Srivastava, Bangalore (IN); Benjamin Campbell, Bury St Edmunds (GB); Joel Linsky, San Diego, CA (US); Mayank Batra, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 17 days.

(21) Appl. No.: 16/990,982

(22) Filed: Aug. 11, 2020

(65) Prior Publication Data
US 2022/0053599 A1    Feb. 17, 2022

(51) Int. Cl.
| | |
|---|---|
| *H04W 76/40* | (2018.01) |
| *H04W 76/15* | (2018.01) |
| *H04L 1/00* | (2006.01) |
| *H04R 5/04* | (2006.01) |
| *H04W 76/19* | (2018.01) |

(52) U.S. Cl.
CPC ........... *H04W 76/40* (2018.02); *H04L 1/0033* (2013.01); *H04R 5/04* (2013.01); *H04W 76/15* (2018.02); *H04W 76/19* (2018.02); *H04R 2420/07* (2013.01)

(58) Field of Classification Search
CPC ....... H04W 76/15; H04W 88/04; H04W 4/00; H04B 17/309; H04R 1/041; H04R 5/033
See application file for complete search history.

(56) References Cited

U.S. PATENT DOCUMENTS

| | | | |
|---|---|---|---|
| 10,244,307 B1* | 3/2019 | Tong | .......................... H04L 1/16 |
| 2004/0228304 A1 | 11/2004 | Riedel et al. | |
| 2012/0020206 A1 | 1/2012 | Busi et al. | |
| 2015/0141021 A1 | 5/2015 | Kapoulas et al. | |
| 2016/0226758 A1 | 8/2016 | Ashwood-Smith | |
| 2019/0260111 A1* | 8/2019 | Muthuswamy | ...... H04R 1/1016 |
| 2019/0327778 A1 | 10/2019 | Morris et al. | |
| 2021/0281991 A1* | 9/2021 | Chen | .................... H04R 1/1091 |

FOREIGN PATENT DOCUMENTS

WO     2019205157 A1     10/2019

OTHER PUBLICATIONS

International Search Report and Written Opinion—PCT/US2021/042356—ISA/EPO—dated Oct. 27, 2021.

* cited by examiner

*Primary Examiner* — Iqbal Zaidi
(74) *Attorney, Agent, or Firm* — Muncy, Geissler, Olds & Lowe, P.C.

(57) ABSTRACT

Reduced Advanced Audio Distribution Profile (A2DP) latency on a link between a source and a pair of headphones may be achieved by improving the quality of the link between secondary and primary and establishing a direct link between the source and secondary to mitigate the link quality issues of the source and primary link. In one example, this involves receiving, via a first receiver, packets from a source on a first wireless connection, determining, by the first receiver, that a first packet received via the first wireless connection has an error, establishing a second connection between the first receiver and a second receiver, and establishing a third connection between the second receiver and the source. In particular, the first receiver may be configured as a primary True Wireless Stereo (TWS) Bluetooth device and the second receiver may be configured as a secondary TWS Bluetooth device.

24 Claims, 6 Drawing Sheets

LATENCY REDUCTION

FIELD OF DISCLOSURE

This disclosure relates generally to wireless audio communication, and more specifically, but not exclusively, to wireless audio communication of packets from a source to a pair of receivers.

BACKGROUND

True Wireless Stereo (TWS) Bluetooth earbuds (e.g., headphones) works in a topology where the Source (which is the source of audio) is connected to just one earbud (out of a pair of 2 earbuds). The one that is connected to Source is called as "Primary". The "Primary" earbud is connected to other earbud called "Secondary". The secondary earbud sniffs the link between the Source and the Primary. The "Primary" earbud (the one connected to Source) has the responsibility to relay lost packets and channel/music to the "Secondary" earbud. TWS earbuds may be considered as earbuds which do not require a cable connection between the two earbuds and likewise no cable connection to a source.

Advanced Audio Distribution Profile (A2DP) standard includes a Bluetooth Stereo profile that defines how high quality stereo audio can be streamed from one device to another over a Bluetooth connection—for example, music streamed from a mobile phone to wireless earbuds. A2DP latency (in TWS) depends on a lot of factor and one of the major factors is the quality/robustness of the links between the Primary & Source and Primary & Secondary.

It is the Primary who does the acknowledging (ACKing)/not acknowledging (NACKing) of the A2DP packets coming from the Source. If the link between the Source & Primary is very noisy, it becomes a challenge to maintain a good A2DP latency under adverse channel conditions.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, an apparatus comprises: a first receiver wirelessly coupled to a source configured to output packets, the first receiver configured as a primary True Wireless Stereo (TWS) Bluetooth device; and a second receiver wirelessly coupled to the first receiver, the second receiver configured as a secondary TWS Bluetooth device; wherein the first receiver is configured to establish a first connection with the source and a second connection with the second receiver, receive a first packet from the source on the first connection, and determine if the received first packet has an error; wherein the second receiver is configured to establish a third connection with the source.

In another aspect, an apparatus comprises: first means for transceiving wirelessly coupled to a source configured to output packets, the first means for transceiving configured as a primary True Wireless Stereo (TWS) Bluetooth device; and second means for transceiving wirelessly coupled to the first means for transceiving, the second means for transceiving configured as a secondary TWS Bluetooth device; wherein the first means for transceiving is configured to establish a first connection with the source and a second connection with the second means for transceiving, receive a first packet from the source on the first connection, and determine if the received first packet has an error; wherein the second means for transceiving is configured to establish a third connection with the source.

In still another aspect, a method for communication comprises: establishing a first connection between a source and a first receiver, the first receiver configured as a True Wireless Stereo (TWS) Bluetooth configured device; receiving a first packet from the source by the first receiver; determining, by the first receiver, the first packet has an error; establishing a second connection between the first receiver and a second receiver, the second receiver configured as a TWS Bluetooth configured device; and establishing a third connection between the second receiver and the source.

In still another aspect, a non-transitory computer-readable medium comprises instructions that when executed by a processor cause the processor to perform a method, the method comprising the method comprises: establishing a first connection between a source and a first receiver, the first receiver configured as a True Wireless Stereo (TWS) Bluetooth configured device; receiving a first packet from the source by the first receiver; determining, by the first receiver, the first packet has an error; establishing a second connection between the first receiver and a second receiver, the second receiver configured as a TWS Bluetooth configured device; and establishing a third connection between the second receiver and the source.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
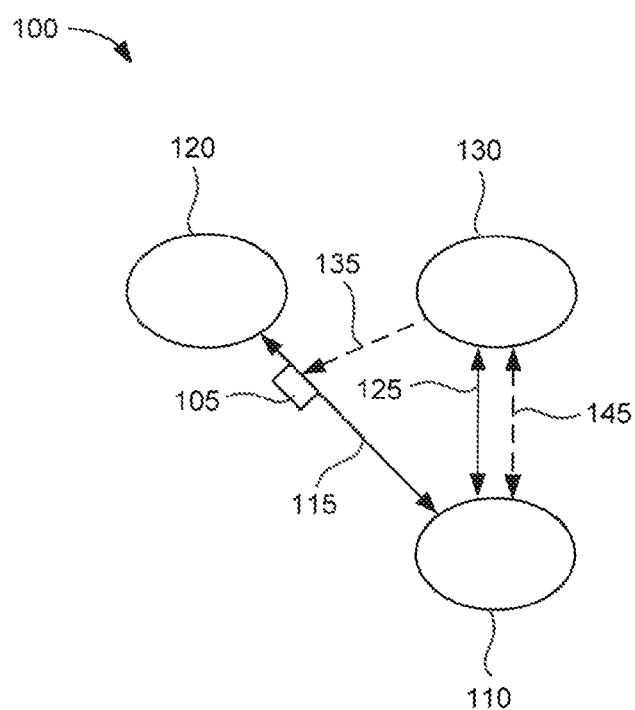
FIG. 1 illustrates an exemplary apparatus in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. In one example, a link between a Phone (i.e., audio source) and a secondary (S) along with a link between a primary (P) and the secondary may be used instead of the link between primary and phone to mitigate the link quality issues of the phone and primary link by using an on demand Secondary to Primary relay of the A2DP packets to reduce the overall A2DP latency. For instance, if the link between the P and Phone is bad and P is getting cyclic redundancy check (CRC) errors, the P can abandon listening to the Phone after a configurable number of attempts (e.g., 3 or 4 CRC packets) and send a sync packet on the P and S relay piconet to get the A2DP packet from the S (if received). If S has received the A2DP packet, S indicates that in the SYNC packet sent by S to P. The P then polls the S and gets the A2DP packet. In another example, packets are relayed in both directions where a first packet was missed by the shadowing slave (secondary) and a second packet was missed by the connected slave (Primary) by the time the SYNC exchange took place. The Primary relayed the first packet and the secondary relayed the second packet. The Primary may indicate that it wants the Secondary to relay the second packet by setting ARQN (acknowledgement indicates a retransmission is required)=NACK in the first packet.

FIG. 1 illustrates an exemplary apparatus in accordance with some examples of the disclosure. As shown in FIG. 1, an apparatus 100 may include a first receiver 110 wirelessly coupled to a source 120 configured to output packets (e.g., first packet 105), the first receiver 110 configured as a primary True Wireless Stereo (TWS) Bluetooth device and a second receiver 130 wirelessly coupled to the first receiver 110, the second receiver 130 configured as a secondary TWS Bluetooth device. The first receiver 110 may be configured to establish a first connection 115 with the source 120 and a second connection 125 with the second receiver 130, receive a first packet 105 (e.g., an A2DP packet or an enhanced Synchronous Connection Oriented Link (eSCO) packet) from the source 120 on the first connection 115, and determine if the received first packet 105 has an error. The second receiver 130 may be configured to establish a third connection 135 with the source 120. The second receiver 130 may be configured to receive the first packet 105 from the source 120 on the third connection 135.

In some examples, the first receiver 110 may also be configured to determine, in response to the determination the first packet 105 has the error, if the second receiver 130 received the first packet 105. Alternatively, the first receiver 110 may also be configured to request the first packet 105 from the second receiver 130 in response to the determination that the second receiver 130 received the first packet 105, determine the first packet 105 received from the second receiver 130 has no error, and transmit an acknowledgement packet to the source 120 in response to determination the first packet 105 received from the second receiver 130 has no error. Alternatively, the first receiver 110 may also be configured to request the first packet 105 from the second receiver 130 in response to the determination that the second receiver 130 received the first packet 105, and the second receiver 130 may be further configured to determine the first packet 105 received from the source 120 by the second receiver 130 has no error, and transmit an acknowledgement packet to the source 120 in response to determination the first packet 105 received from the source 120 by the second receiver 130 has no error. In addition, the first receiver 110 may also be configured to receive a second packet (e.g., first packet 105) from the source 120, and transmit the second packet from the first receiver 110 to the second receiver 130 in response to a determination the second receiver 130 did not receive the second packet. Also, the source 120 may be incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

In some examples, the connections may be True Wireless Stereo type connections between the source 120 and the first receiver 110 (e.g., configured as a primary connection), the first receiver 110 and the second receiver 130 (e.g., configured as a secondary connection), and the second receiver 130 and the source 120 (e.g., sniffing the primary connection). It should be understood that sniffing the primary connection may also include additional functionality such as sending and receiving acknowledgment and non-acknowledgment packets. There may also be a relay connection 145 between the first receiver 110 and the second receiver 130 for selective relaying of packets. This may include a mechanism for exchanging bitmaps of information indicating the status of packets received from the source, sequence number (SEQN) of those packets, information related to AES-CCM payload counters, reference clock values etc. This mechanism may also allow packets missed by the second receiver 130 to be identified and relayed (also referred to as a "selective relay").

In some examples herein, the mechanism may allow the relay connection 145 to establish a virtual piconet between the first receiver 110 and the second receiver 130 that functions as the backbone for the selective relay of packets; use the second receiver's 130 address (e.g., BD_ADDR) to generate an access code that prevents unwanted synchronizing of packets sent on this piconet; allow the first receiver 110 and the second receiver 130 to synchronize states before the selective relay takes place; allow the second receiver 130 to mark certain packets as "ignore" which means that those packets will not be selectively relayed, such as for marking Link Manger Protocol (LMP) messages which are relayed via a different protocol or marking certain L2CAP Channel IDs; and use a separate packet (e.g., FHS packet) that is not part of the regular ARQN (acknowledgement) scheme to exchange bitmaps of information.

Figure 2:
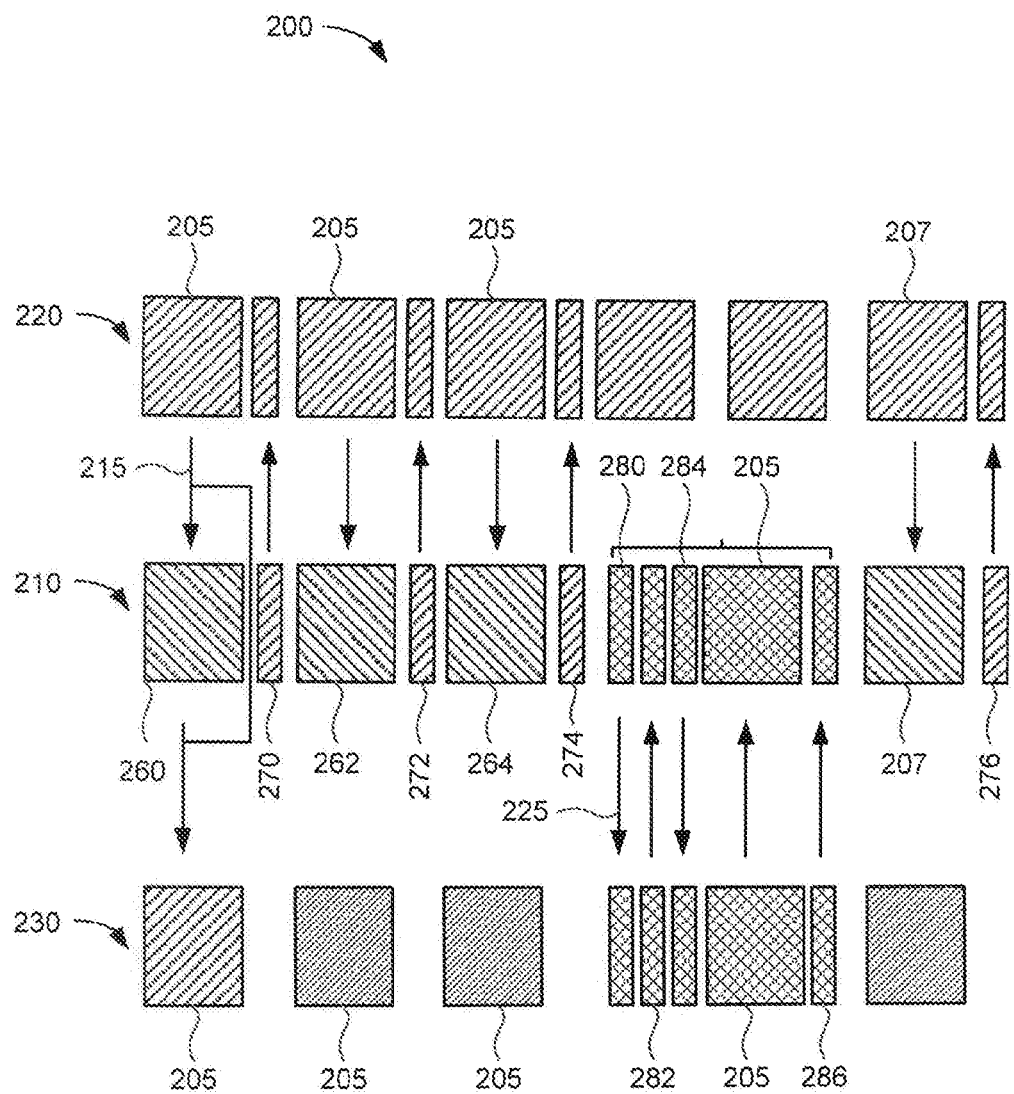
FIG. 2 illustrates a timing diagram of the operation of an exemplary apparatus in accordance with some examples of the disclosure.

FIG. 2 illustrates a timing diagram of the operation of an exemplary apparatus in accordance with some examples of the disclosure. In some operations, the apparatus makes use of a better connection quality of the connection between source and second receiver as well as the connection between the first receiver and the second receiver as shown in FIG. 2 to mitigate quality issues of the connection between the source and first receiver. Thus, examples herein may provide an on demand second receiver to first receiver (e.g., secondary to primary) relay of the packets to reduce the overall latency.

For example, if the connection between the source and first receiver is bad (i.e., the first receiver is getting errors), the first receiver may abandon listening to the source after a configurable number of attempts (e.g., errors in 3 or 4 CRC packets, consecutively or in a defined transmission window). The first receiver may then send a SYNC packet on the relay connection between the first receiver and the second receiver to get the first packet. If the second receiver has received the first packet, the second receiver may indicate this to the first receiver over the relay connection. This may allow the first receiver to request/poll the second receiver to get the first packet. After which, the first receiver may switch back to the connection between the source and the first receiver for subsequent packets or re-transmitted (same SEQN number) packets from the source (with/without CRC errors), and ACK (by the first receiver over the first connection or the second receiver over the third connection) that the first receiver has the first packet (or optionally ask the second receiver to ACK the first packet as well). It should be understood that the third connection may include additional functionality in addition to sniffing, such as sending and receiving acknowledgment and non-acknowledgment packets and similar TWS or Bluetooth packets or operations.

As shown in FIG. 2, an apparatus (e.g., apparatus 100) may provide a method 200 for transmitting a first packet 205 from a source 220 to a first receiver 210 and a second receiver 230. As shown, the source 220 may transmit a first packet 205 to the first receiver 210 over a first connection 215. The first receiver 210, however, may determine if the first packet 205 has an error, first error packet 260. As shown, the first packet 205 may be received by the second receiver 230 over the first connection 215 without errors (in response to the first error packet 260 or not). In response to the first error packet 260, the first receiver 210 may send a first NACK packet 270 to the source 220 over the first connection 215. In response to receiving the first NACK packet 270, the source 220 may re-send the first packet 205 to the first receiver 210 over the first connection 215. The first receiver 210 determines if the packet has an error, second error packet 262. In response to the second error packet 262, the first receiver 210 may send a second NACK packet 272 to the source 220 over the first connection 215. In response to receiving the second NACK packet 272, the source 220 may re-send the first packet 205 to the first receiver 210 over the first connection 215. The first receiver 210 determines if the packet has an error, third error packet 264. In response to the third error packet 264, the first receiver 210 may send a third NACK packet 274 to the source 220 over the first connection 215. While three attempts are shown in FIG. 2, it should be understood that more or less than three transmission attempts may be made before switching connections.

As shown in FIG. 2, after the third NACK packet 274 is sent, the first receiver 210 may switch connections and send a first sync packet 280 to the second receiver 230 over the second connection 225 (or, for example, over the relay connection 145). In response to receiving the first sync packet 280, the second receiver may determine the first packet 205 was received without error and indicate so in a second sync packet 282 sent to the first receiver 210. In response to the second sync packet 282 indicating the second receiver 230 has the first packet 205, the first receiver 210 may send a request packet 284 to the second receiver 230 requesting the second receiver 230 send the first packet 205 to the first receiver 210 over the second connection 225 (or relay connection 145). After the first receiver 210 has the first packet 205, the first receiver 210 may switch back to the first connection 215 to receive a second packet 207 from the source 220. If the first receiver 210 determines the second packet has no errors, the first receiver may send an ACK packet 276 to the source 220.

In some examples, a second receiver 230 may send an acknowledgement packet 286 to the first receiver 210 in response to sending the first packet 205 to the first receiver 210. Subsequently, the first receiver 210 or the second receiver 230 may send an acknowledgement packet to the source 220 to acknowledge the receipt of the first packet 205 by the first receiver 210. In this way, the source may be informed the successfully receipt of the currently transmitted packet as soon as possible, regardless of whether the currently transmitted packet is successfully received initially by the first receiver or received by the second receiver, which may cause the source to begin a transmission of a next packet as early as possible. Thus, based on the early acknowledging, the increased latency due to increased waiting time for the acknowledgment of the currently transmitted packet before a next packet transmission may be reduced, wherein the increased waiting time may be consumed by P to request S to relay the currently transmitted packet that is received by P with an error, or ask the source to retransmit the currently transmitted packet several times when the quality of the link between P and the source degrades.

Figure 3:
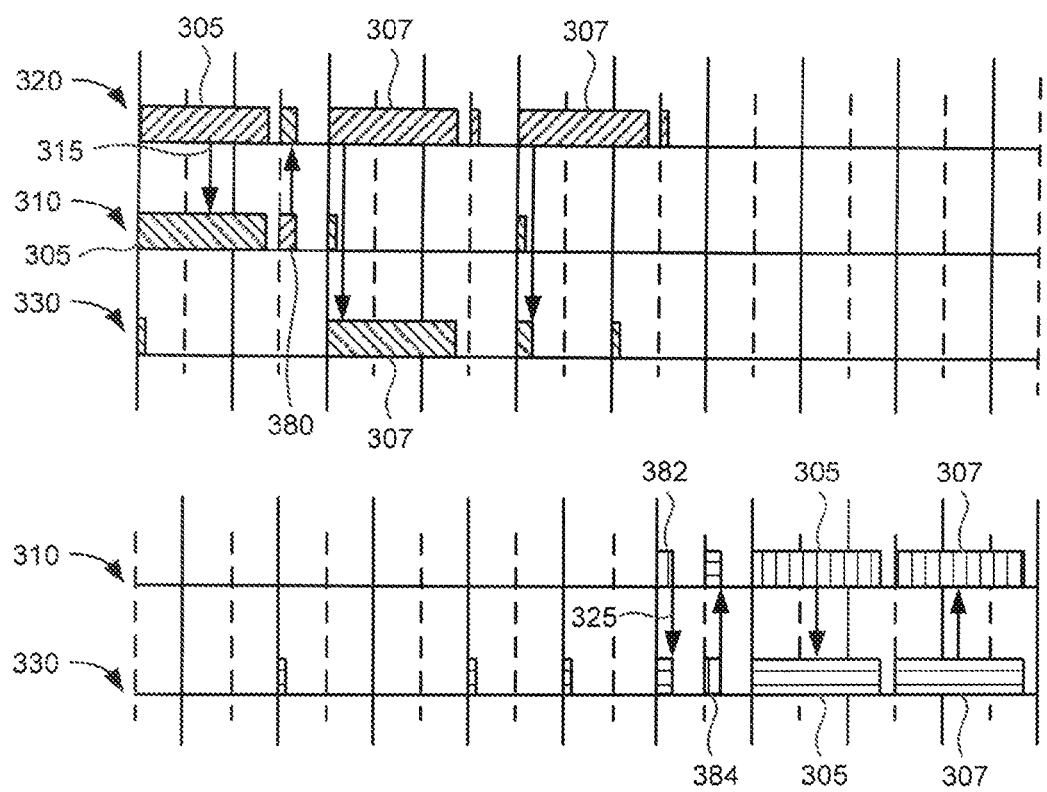
FIG. 3 illustrates a timing diagram of the operation of another exemplary apparatus in accordance with some examples of the disclosure.

FIG. 3 illustrates a timing diagram of the operation of another exemplary apparatus in which packets are sent or relayed in both directions. As shown in FIG. 3, a first packet 305 and a second packet 307 may be sent from a source 320 to a first receiver 310 over a first connection 315 and a second receiver 330 over the first connection 315 or second connection 325. If the second receiver 330 did not receive the first packet 305 or it was received with errors and a second packet 307 was missed or received with error by the first receiver 310, the missed or error containing packets may be resent as from various points and regulated by sync packets.

As shown in FIG. 3, a source 320 sends a first packet 305 to a first receiver 310 and a second receiver 330 over a first connection 315. If the first receiver 310 receives the first packet 305, an ACK packet 380 may be sent by the first receiver 310 to the source 320 indicating the first receiver 310 received the first packet 305. In response to the ACK packet 380, the source 320 may send a second packet 307 to the first receiver 310.

If a second receiver 330 did not receive the first packet 305 (or received with errors), a NACK packet may be sent to the first receiver 310. In response or as a check, the first receiver 310 may send a sync packet 382 to the second receiver 330 over the second connection 325 (or a separate relay connection, e.g., relay connection 145). If the second receiver 330 missed the first packet 305, the second receiver 330 may send a sync request 384 to the first receiver 310. In response to the sync request 384, the first receiver 310 may send the first packet 305 over the second connection 325 to the second receiver 330.

If the first receiver 310 did not receive the second packet 307 (or received with errors) or as a check, the first receiver 310 may send a sync packet 382 to the second receiver 330 over the second connection 325 (or a separate relay connection, e.g., relay connection 145). If the second receiver 330 has the second packet 307, the second receiver 330 may send the second packet 307 over the second connection 325 to the first receiver 310. The first receiver 310 may indicate a missing packet by, for example, setting ARQN=NACK in Packet 1.

Figure 4:
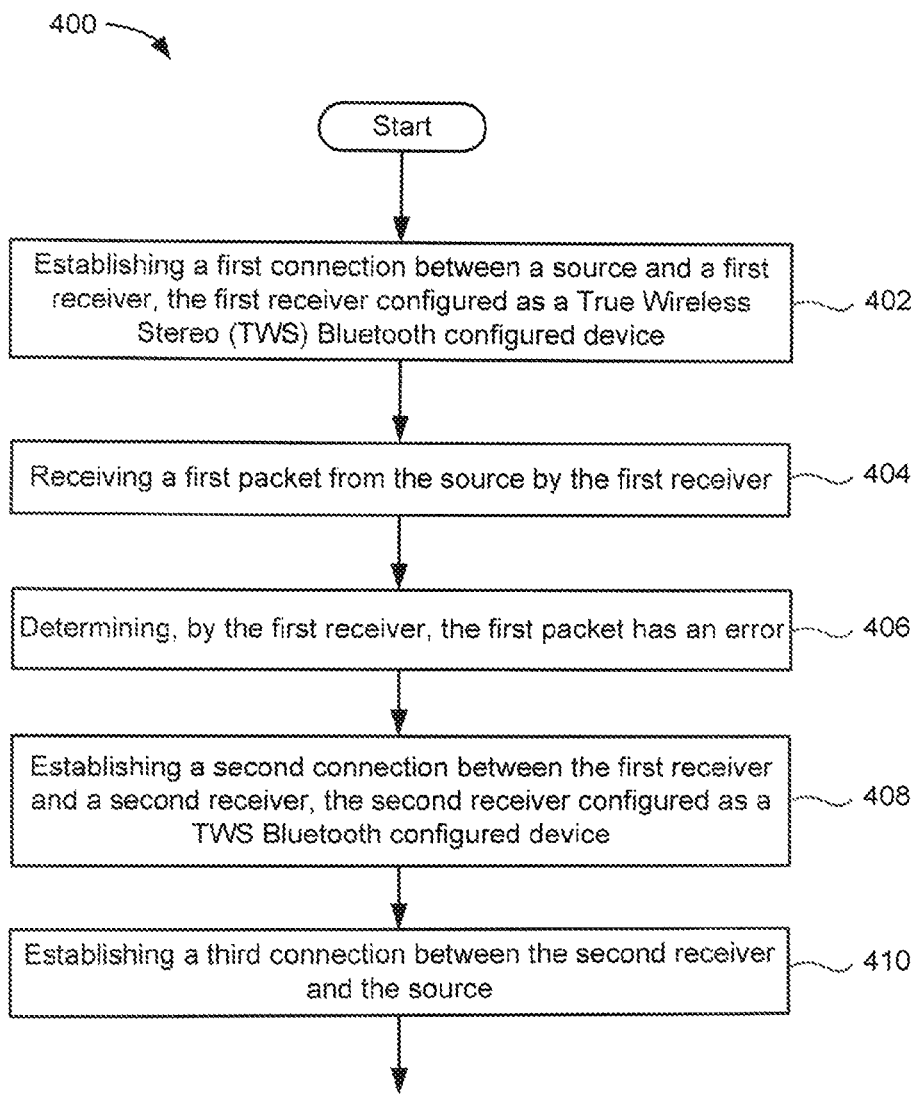
FIG. 4 illustrates an exemplary partial method in accordance with some examples of the disclosure.

FIG. 4 illustrates an exemplary partial method in accordance with some examples of the disclosure. As shown in FIG. 4, the partial method 400 may begin in block 402 with establishing a first connection between a source and a first receiver, the first receiver configured as a True Wireless Stereo (TWS) Bluetooth configured device. The partial method 400 may continue in block 404 with receiving a first packet from the source by the first receiver. The partial method 400 may continue in block 406 with determining, by the first receiver, the first packet has an error. The partial method 400 may continue in block 408 with establishing a second connection between the first receiver and a second receiver, the second receiver configured as a TWS Bluetooth configured device. Block 408 may also involve using a previously established second connection between the first receiver and the second receiver. The partial method 400 may conclude in block 410 with establishing a third connection between the second receiver and the source.

Alternatively, the partial method 400 may include receiving, by the second receiver, the first packet from the source; determining if the second receiver received the first packet in response to the determination the first packet has the error; requesting, by the first receiver, the first packet from the second receiver in response to the determination that the second receiver received the first packet, determining, by the first receiver, the first packet received from the second receiver has no error, and transmitting, by the first receiver, an acknowledgement packet to the source in response to determination the first packet received from the second receiver has no error; requesting, by the first receiver, the first packet from the second receiver in response to the determination that the second receiver received the first packet, determining, by the second receiver, the first packet received from the source has no error, and transmitting, by the second receiver, an acknowledgement packet to the source in response to determination the first packet received from the source by the second receiver has no error; receiving, by the first receiver, a second packet from the source, and transmitting, by the first receiver, the second packet to the second receiver in response to a determination the second receiver did not receive the second packet; incorporating the source into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle; and wherein the first packet is an A2DP packet.

In another alternative, the first receiver (e.g., primary earbud) may poll the second receiver (e.g., secondary earbud) after detecting a threshold (configurable and/or dynamic) number of bad packets (e.g., consecutively or in a specified time window) and the second receiver may reply by transmitting either: (a) the last packet the second receiver received from the source (e.g., a handset) (In addition, metadata may be added to the reply to describe the packet TX time, for example); (b) the last packet the second receiver received that it determines is a retransmission from the source, or empty packet if it has not detected a retransmission. Additionally, the second receiver may self-determine that a packet is a retransmission from the source (based on sequence number and back-to-back re-transmission, for example) and autonomously decide to retransmit that packet to the first receiver a known time after the source transmitted the packet. The first receiver may then have the option to listen for that retransmission.

In still other alternatives, an apparatus may include a secondary to primary relay and early acknowledging of a packet. For example, an apparatus may comprise: a first receiver configured as a primary TWS Bluetooth device and a second receiver configured as a secondary TWS Bluetooth device. In this example, the first receiver may be configured to: establish a first connection with a source configured to output packets and a second connection with the second receiver; receive a first packet from the source on the first connection; determine if the received first packet has an error; and receive the first packet from the second receiver on the second connection in response to determining the first packet has the error.

In another example, an apparatus may comprise: a first receiver configured as a primary TWS Bluetooth device and a second receiver configured as a secondary TWS Bluetooth device. In this example, the first receiver may be configured to: establish a first connection with a source configured to output packets and a second connection with the second receiver; receive a first packet from the source on the first connection; determine if the received first packet has an error; and wherein the second receiver is configured to: receive the first packet output from the source; determine if the received first packet by the second receiver has an error; and send an acknowledge packet to the source in response to determining the received first packet by the second receiver has no error. In alternative configurations, the second receiver may be further configured to: send the acknowledge packet to the source via the second connection and the first connection; or establish a third connection with the source configured to output packets and send the acknowledge packet to the source over the third connection. Also, the first receiver may be further configured to: receive the first packet from the second receiver on the second connection in response to determining the first packet received by the first receiver has the error.

Figure 5:
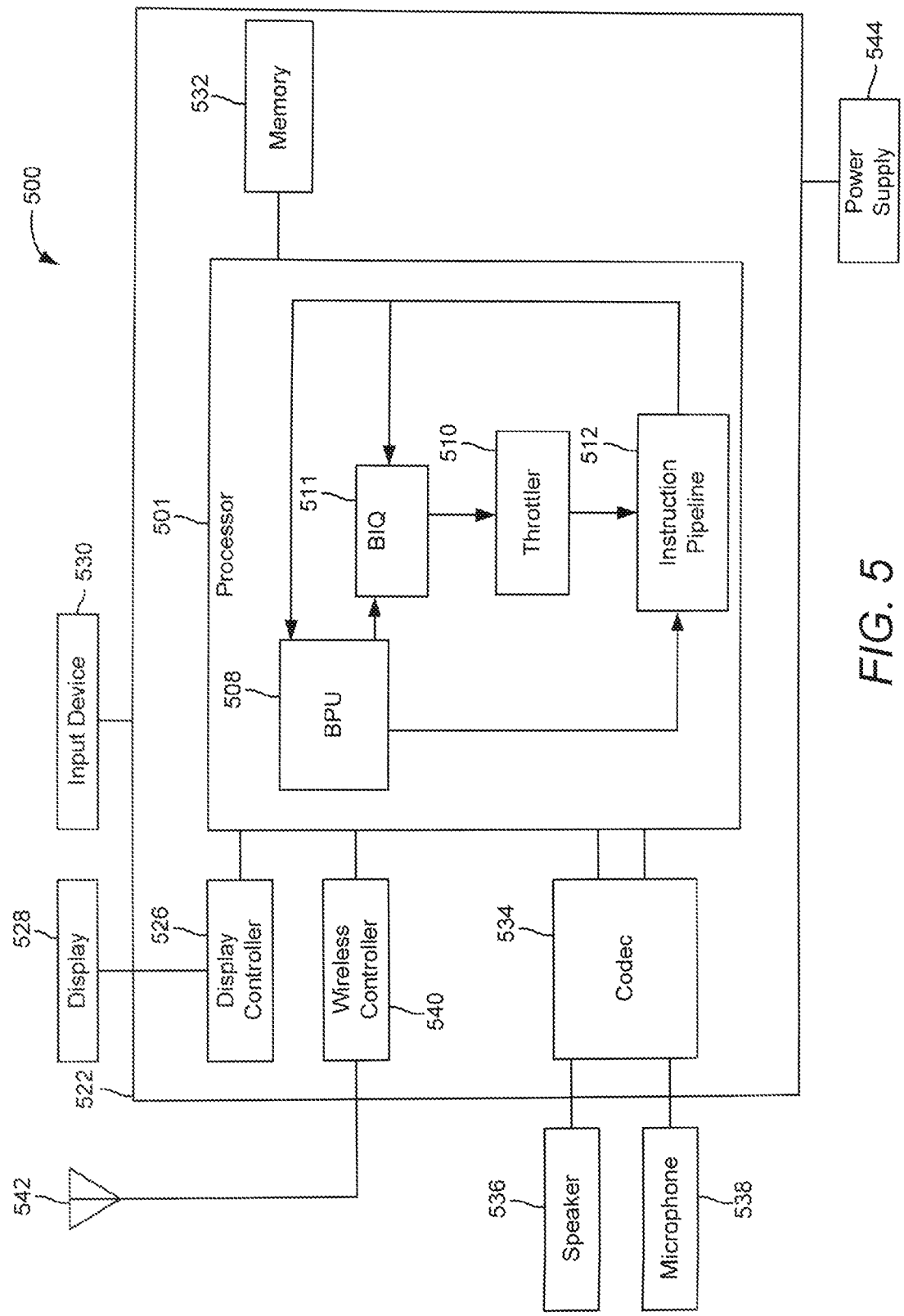
FIG. 5 illustrates an exemplary mobile device in accordance with some examples of the disclosure.

FIG. 5 illustrates an exemplary mobile device in accordance with some examples of the disclosure. Referring now to FIG. 5, a block diagram of a mobile device that is configured according to exemplary aspects is depicted and generally designated 500. In some aspects, mobile device 500 may be configured as a wireless communication device. As shown, mobile device 500 includes processor 501, which may be configured to implement the methods described herein in some aspects. Processor 501 is shown to comprise instruction pipeline 512, buffer processing unit (BPU) 508, branch instruction queue (BIQ) 511, and throttler 510 as is well known in the art. Other well-known details (e.g., counters, entries, confidence fields, weighted sum, comparator, etc.) of these blocks have been omitted from this view of processor 501 for the sake of clarity.

Processor 501 may be communicatively coupled to memory 532 over a link, which may be a die-to-die or chip-to-chip link. Mobile device 500 also include display 528 and display controller 526, with display controller 526 coupled to processor 501 and to display 528.

In some aspects, FIG. 5 may include coder/decoder (CODEC) 534 (e.g., an audio and/or voice CODEC) coupled to processor 501; speaker 536 and microphone 538 coupled to CODEC 534; and wireless controller 540 (which may include a modem) coupled to wireless antenna 542 and to processor 501.

In a particular aspect, where one or more of the above-mentioned blocks are present, processor 501, display controller 526, memory 532, CODEC 534, and wireless controller 540 can be included in a system-in-package or system-on-chip device 522. Input device 530 (e.g., physical or virtual keyboard), power supply 544 (e.g., battery), display 528, input device 530, speaker 536, microphone 538, wireless antenna 542, and power supply 544 may be external to system-on-chip device 522 and may be coupled to a component of system-on-chip device 522, such as an interface or a controller.

It should be noted that although FIG. 5 depicts a mobile device, processor 501 and memory 532 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 6:
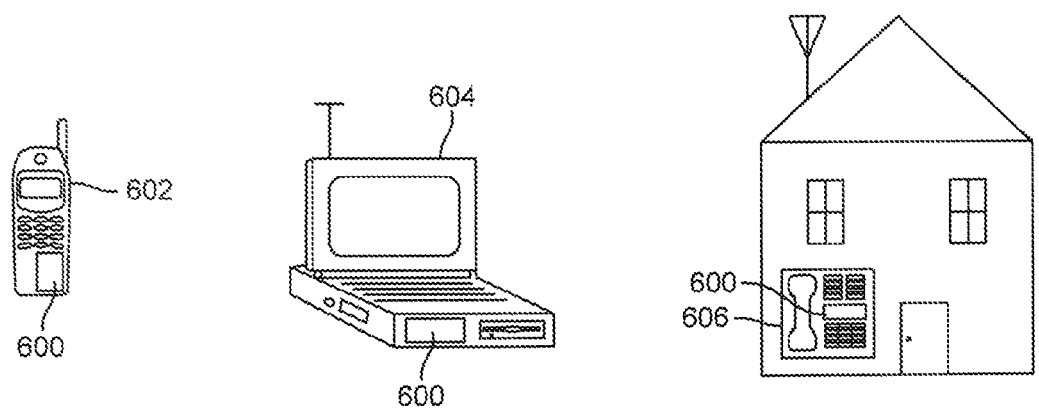
FIG. 6 illustrates various electronic devices that may be integrated with any of the aforementioned methods, devices, semiconductor devices, integrated circuits, die, interposers, packages, or package-on-packages (PoPs) in accordance with some examples of the disclosure.

FIG. 6 illustrates various electronic devices that may be integrated with any of the aforementioned integrated device, semiconductor device, integrated circuit, die, interposer, package or package-on-package (PoP) in accordance with some examples of the disclosure. For example, a mobile phone device 602, a laptop computer device 604, and a fixed location terminal device 606 may include an integrated device 600 as described herein. The integrated device 600 may be, for example, any of the integrated circuits, dies, integrated devices, integrated device packages, integrated circuit devices, device packages, integrated circuit (IC) packages, package-on-package devices described herein. The devices 602, 604, 606 illustrated in FIG. 6 are merely exemplary. Other electronic devices may also feature the integrated device 600 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. It should furthermore be noted that methods, systems, and apparatus disclosed in the description or in the claims can be implemented by a device comprising means for performing the respective actions of this method. For example, in one aspect, an apparatus may comprise first means for transceiving (e.g., first receiver) wirelessly coupled to a source configured to output packets, the first means for transceiving configured as a primary True Wireless Stereo (TWS) Bluetooth device; and second means for transceiving (e.g., second receiver) wirelessly coupled to the first means for transceiving, the second means for transceiving configured as a secondary TWS Bluetooth device; wherein the first means for transceiving is configured to establish a first connection with the source and a second connection with the second means for transceiving, receive a first packet from the source on the first connection, and determine if the received first packet has an error; wherein the second means for transceiving is configured to establish a third connection with the source. It will be appreciated that the aforementioned aspects are merely provided as examples and the various aspects claimed are not limited to the specific references and/or illustrations cited as examples.

One or more of the components, processes, features, and/or functions illustrated in FIGS. 1-6 may be rearranged and/or combined into a single component, process, feature or function or incorporated in several components, processes, or functions. Additional elements, components, processes, and/or functions may also be added without departing from the disclosure. It should also be noted that FIGS. 1-6 and its corresponding description in the present disclosure is not limited to dies and/or ICs. In some implementations, FIGS. 1-6 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer. An active side of a device, such as a die, is the part of the device that contains the active components of the device (e.g. transistors, resistors, capacitors, inductors etc.), which perform the operation or function of the device. The backside of a device is the side of the device opposite the active side. As used herein, a metallization structures may include metal layers, vias, pads, or traces with dielectric between, such as a redistribution layer or RDL).

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wire line connection, or other connection, regardless of whether satellite signal reception, assistance data reception, and/or position-related processing occurs at the device or at the other device. In addition, these terms are intended to include all devices, including wireless and wire line communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wire line phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to an uplink/reverse or downlink/forward traffic channel.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE), IEEE 802.11 (WiFi), and IEEE 802.15.4 (Zigbee/Thread) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

The following section provides various examples for facilitating understanding the present invention:

1. An apparatus comprising:
   a first receiver coupled via a first wireless connection to a source configured to output packets; and
   a second receiver coupled to the first receiver via a second wireless connection;
   wherein the first receiver is configured to receive packets from the source on the first wireless connection, and to determine if a received first packet has an error; and
   wherein the second receiver is configured to establish a third wireless connection with the source.

2. The apparatus of example 1, wherein
   the first receiver is configured as a primary True Wireless Stereo, TWS, Bluetooth device; and
   the second receiver is configured as a secondary TWS Bluetooth device.

3. The apparatus of example 1 or 2, wherein the first packet is an Advanced Audio Distribution Profile, A2DP, packet.

4. The apparatus of one or more of the preceding examples, wherein the second receiver is further configured to receive the first packet from the source.

5. The apparatus of example 4, wherein the first receiver is further configured to determine, in response to the determination the first packet has the error, if the second receiver received the first packet.

6. The apparatus of example 5, wherein the first receiver is further configured to request the first packet from the second receiver in response to the determination that the second receiver received the first packet, determine the first packet received from the second receiver has no error, and transmit an acknowledgement packet to the source in response to determination the first packet received from the second receiver has no error.

7. The apparatus of example 5, wherein the first receiver is further configured to request the first packet from the second receiver in response to the determination that the second receiver received the first packet, and the second receiver is further configured to determine the first packet received from the source by the second receiver has no error, and transmit an acknowledgement packet to the source in response to determination the first packet received from the source by the second receiver has no error.

8. The apparatus of one or more of the preceding examples, wherein the first receiver is configured to receive a second packet from the source, and transmit the second packet from the first receiver to the second receiver in response to a determination the second receiver did not receive the second packet.

9. The apparatus of one or more of the preceding examples, wherein the source is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

10. An apparatus comprising:
    first means for transceiving coupled via a first wireless connection to a source configured to output packets; and
    second means for transceiving coupled to the first receiver via a second wireless connection;
    wherein the first means for transceiving is configured to receive packets from the source on the first wireless connection, and to determine if a received first packet has an error; and
    wherein the second means for transceiving is configured to establish a third wireless connection with the source.

11. The apparatus of example 10, wherein:
    the first means for transceiving is configured as a primary True Wireless Stereo, TWS, Bluetooth device; and
    the second means for transceiving is configured as a secondary TWS Bluetooth device.

12. The apparatus of example 10 or/and 11, wherein the first packet is an Advanced Audio Distribution Profile, A2DP, packet.

13. The apparatus of one or more of the preceding examples 10 to 12, wherein the second means for transceiving is further configured to receive the first packet from the source.

14. The apparatus of example 13, wherein the first means for transceiving is further configured to determine, in response to the determination the first packet has the error, if the second means for transceiving received the first packet.

15. The apparatus of example 14, wherein the first means for transceiving is further configured to request the first packet from the second means for transceiving in response to the determination that the second means for transceiving received the first packet, determine the first packet received from the second means for transceiving has no error, and transmit an acknowledgement packet to the source in response to determination the first packet received from the second means for transceiving has no error.

16. The apparatus of example 14, wherein the first means for transceiving is further configured to request the first packet from the second means for transceiving in response to the determination that the second means for transceiving received the first packet, and the second means for transceiving is further configured to determine the first packet received from the source by the second means for transceiving has no error, and transmit an acknowledgement packet to the source in response to determination the first packet received from the source by the second means for transceiving has no error.

17. The apparatus of one or more of the preceding examples 10 to 16, wherein the first means for transceiving is configured to receive a second packet from the source, and transmit the second packet from the first means for transceiving to the second means for transceiving in response to a determination the second means for transceiving did not receive the second packet.

18. The apparatus of one or more of the preceding examples 10 to 17, wherein the source is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

19. A method for communication, the method comprising:
receiving, via a first receiver, packets from a source on a first wireless connection;
determining, by the first receiver, that a first packet has an error;
establishing a second connection between the first receiver and a second receiver; and
establishing a third connection between the second receiver and the source.

20. The method of example 19, wherein:
the first receiver is configured as a primary True Wireless Stereo, TWS, Bluetooth device; and
the second receiver is configured as a secondary TWS Bluetooth device.

21. The method of example 19 or/and 20, wherein the first packet is an Advanced Audio Distribution Profile, A2DP, packet.

22. The method of one or more of the preceding examples 19 to 21, further comprising receiving, by the second receiver, the first packet from the source.

23. The method of example 22, further comprising determining, in response to the determination the first packet has the error, if the second receiver received the first packet.

24. The method of example 23, further comprising requesting, by the first receiver, the first packet from the second receiver in response to the determination that the second receiver received the first packet, determining, by the first receiver, the first packet received from the second receiver has no error, and transmitting, by the first receiver, an acknowledgement packet to the source in response to determination the first packet received from the second receiver has no error.

25. The method of example 23, further comprising requesting, by the first receiver, the first packet from the second receiver in response to the determination that the second receiver received the first packet, determining, by the second receiver, the first packet received from the source has no error, and transmitting, by the second receiver, an acknowledgement packet to the source in response to determination the first packet received from the source by the second receiver has no error.

26. The method of one or more of the preceding examples 19 to 25, further comprising receiving, by the first receiver, a second packet from the source, and transmitting, by the first receiver, the second packet to the second receiver in response to a determination the second receiver did not receive the second packet.

27. The method of one or more of the preceding examples 19 to 26, further comprising incorporating the source into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

28. A non-transitory computer-readable medium comprising instructions that when executed by a processor cause the processor to perform a method, the method comprising:
receiving, via a first receiver, packets from a source on a first wireless connection;
determining, by the first receiver, that a first packet has an error;
establishing a second connection between the first receiver and a second receiver; and
establishing a third connection between the second receiver and the source.

29. The non-transitory computer-readable medium of example 28, wherein:
the first receiver is configured as a primary True Wireless Stereo, TWS, Bluetooth device; and
the second receiver is configured as a secondary TWS Bluetooth device.

30. The non-transitory computer-readable medium of example 28 or/and 29, wherein the first packet is an Advanced Audio Distribution Profile, A2DP, packet.

31. The non-transitory computer-readable medium of one or more of the preceding examples 28 to 30, further comprising receiving, by the second receiver, the first packet from the source.

32. The non-transitory computer-readable medium of example 31, further comprising determining, in response to the determination the first packet has the error, if the second receiver received the first packet.

33. The non-transitory computer-readable medium of example 32, further comprising requesting, by the first receiver, the first packet from the second receiver in response to the determination that the second receiver received the first packet, determining, by the first receiver, the first packet received from the second receiver has no error, and transmitting, by the first receiver, an acknowledgement packet to the source in response to determination the first packet received from the second receiver has no error.

34. The non-transitory computer-readable medium of example 32, further comprising requesting, by the first receiver, the first packet from the second receiver in response to the determination that the second receiver received the first packet, determining, by the second receiver, the first packet received from the source has no error, and transmitting, by the second receiver, an acknowledgement packet to the source in response to determination the first packet received from the source by the second receiver has no error.

35. The non-transitory computer-readable medium of one or more of the preceding examples 28 to 34, further comprising receiving, by the first receiver, a second packet from the source, and transmitting, by the first receiver, the second packet to the second receiver in response to a determination the second receiver did not receive the second packet.

36. The non-transitory computer-readable medium of one or more of the preceding examples 28 to 35, further comprising incorporating the source into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

37. A computer program comprising instructions that, when executed on a computer, cause the computer to perform the steps of one or more of the examples 19 to 27.

What is claimed is:

1. An apparatus comprising:
a first receiver wirelessly coupled to a source configured to output packets, the first receiver configured as a primary True Wireless Stereo (TWS) Bluetooth device; and
a second receiver wirelessly coupled to the first receiver, the second receiver configured as a secondary TWS Bluetooth device;
wherein the first receiver is configured to establish a first connection with the source and a second connection with the second receiver, receive a first packet from the source on the first connection, and determine whether the received first packet has an error;
wherein the second receiver is configured to establish a third connection with the source and receive the first packet from the source;
wherein the first receiver is further configured to determine whether the second receiver received the first packet in response to the determination that the first packet has the error.

2. The apparatus of claim 1, wherein the first packet is an Advanced Audio Distribution Profile (A2DP) packet.

3. The apparatus of claim 1, wherein the first receiver is further configured to request the first packet from the second receiver in response to the determination that the second receiver received the first packet, determine the first packet received from the second receiver has no error, and transmit an acknowledgement packet to the source in response to determination the first packet received from the second receiver has no error.

4. The apparatus of claim 1, wherein the first receiver is further configured to request the first packet from the second receiver in response to the determination that the second receiver received the first packet, and the second receiver is further configured to determine the first packet received from the source by the second receiver has no error, and transmit an acknowledgement packet to the source in response to determination the first packet received from the source by the second receiver has no error.

5. The apparatus of claim 1, wherein the first receiver is configured to receive a second packet from the source, and transmit the second packet from the first receiver to the second receiver in response to a determination the second receiver did not receive the second packet.

6. The apparatus of claim 1, wherein the source is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

7. An apparatus comprising:
first means for transceiving wirelessly coupled to a source configured to output packets, the first means for transceiving configured as a primary True Wireless Stereo (TWS) Bluetooth device; and
second means for transceiving wirelessly coupled to the first means for transceiving, the second means for transceiving configured as a secondary TWS Bluetooth device;
wherein the first means for transceiving is configured to establish a first connection with the source and a second connection with the second means for transceiving, receive a first packet from the source on the first connection, and determine whether the received first packet has an error;
wherein the second means for transceiving is configured to establish a third connection with the source and receive the first packet from the source;
wherein the first means for transceiving is further configured to determine whether the second means for transceiving received the first packet in response to the determination that the first packet has the error.

8. The apparatus of claim 7, wherein the first packet is an Advanced Audio Distribution Profile (A2DP) packet.

9. The apparatus of claim 7, wherein the first means for transceiving is further configured to request the first packet from the second means for transceiving in response to the determination that the second means for transceiving received the first packet, determine the first packet received from the second means for transceiving has no error, and transmit an acknowledgement packet to the source in response to determination the first packet received from the second means for transceiving has no error.

10. The apparatus of claim 7, wherein the first means for transceiving is further configured to request the first packet from the second means for transceiving in response to the determination that the second means for transceiving received the first packet, and the second means for transceiving is further configured to determine the first packet received from the source by the second means for transceiving has no error, and transmit an acknowledgement packet to the source in response to determination the first packet received from the source by the second means for transceiving has no error.

11. The apparatus of claim 7, wherein the first means for transceiving is configured to receive a second packet from the source, and transmit the second packet from the first means for transceiving to the second means for transceiving in response to a determination the second means for transceiving did not receive the second packet.

12. The apparatus of claim 7, wherein the source is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

13. A method for communication, the method comprising:
establishing a first connection between a source and a first receiver, the first receiver configured as a True Wireless Stereo (TWS) Bluetooth configured device;
receiving a first packet from the source by the first receiver;
determining, by the first receiver, whether the first packet has an error;
establishing a second connection between the first receiver and a second receiver, the second receiver configured as a TWS Bluetooth configured device;
establishing a third connection between the second receiver and the source;
receiving, by the second receiver, the first packet from the source; and
determining whether the second receiver received the first packet in response to the determination that the first packet has the error.

14. The method of claim 13, wherein the first packet is an Advanced Audio Distribution Profile (A2DP) packet.

15. The method of claim 13, further comprising requesting, by the first receiver, the first packet from the second receiver in response to the determination that the second receiver received the first packet, determining, by the first receiver, the first packet received from the second receiver has no error, and transmitting, by the first receiver, an acknowledgement packet to the source in response to determination the first packet received from the second receiver has no error.

16. The method of claim 13, further comprising requesting, by the first receiver, the first packet from the second receiver in response to the determination that the second receiver received the first packet, determining, by the second receiver, the first packet received from the source has no error, and transmitting, by the second receiver, an acknowledgement packet to the source in response to determination the first packet received from the source by the second receiver has no error.

17. The method of claim 13, further comprising receiving, by the first receiver, a second packet from the source, and transmitting, by the first receiver, the second packet to the second receiver in response to a determination the second receiver did not receive the second packet.

18. The method of claim 13, further comprising incorporating the source into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

19. A non-transitory computer-readable medium comprising instructions that when executed by a processor cause the processor to perform a method, the method comprising:
 establishing a first connection between a source and a first receiver, the first receiver configured as a True Wireless Stereo (TWS) Bluetooth configured device;
 receiving a first packet from the source by the first receiver;
 determining, by the first receiver, the first packet has an error;
 establishing a second connection between the first receiver and a second receiver, the second receiver configured as a TWS Bluetooth configured device;
 establishing a third connection between the second receiver and the source;
 receiving, by the second receiver, the first packet from the source; and
 determining whether the second receiver received the first packet in response to the determination that the first packet has the error.

20. The non-transitory computer-readable medium of claim 19, wherein the first packet is an Advanced Audio Distribution Profile (A2DP) packet.

21. The non-transitory computer-readable medium of claim 19, further comprising requesting, by the first receiver, the first packet from the second receiver in response to the determination that the second receiver received the first packet, determining, by the first receiver, the first packet received from the second receiver has no error, and transmitting, by the first receiver, an acknowledgement packet to the source in response to determination the first packet received from the second receiver has no error.

22. The non-transitory computer-readable medium of claim 19, further comprising requesting, by the first receiver, the first packet from the second receiver in response to the determination that the second receiver received the first packet, determining, by the second receiver, the first packet received from the source has no error, and transmitting, by the second receiver, an acknowledgement packet to the source in response to determination the first packet received from the source by the second receiver has no error.

23. The non-transitory computer-readable medium of claim 19, further comprising receiving, by the first receiver, a second packet from the source, and transmitting, by the first receiver, the second packet to the second receiver in response to a determination the second receiver did not receive the second packet.

24. The non-transitory computer-readable medium of claim 19, further comprising incorporating the source into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

* * * * *